United States Patent
Teague

(10) Patent No.: US 10,099,542 B2
(45) Date of Patent: Oct. 16, 2018

(54) VEHICLE ATTACHED SHIELDING ASSEMBLY

(71) Applicant: Steve Teague, Harvest, AL (US)

(72) Inventor: Steve Teague, Harvest, AL (US)

( * ) Notice: Subject to any disclaimer, the term of this patent is extended or adjusted under 35 U.S.C. 154(b) by 1 day.

(21) Appl. No.: 15/415,045

(22) Filed: Jan. 25, 2017

(65) Prior Publication Data
US 2018/0208030 A1    Jul. 26, 2018

(51) Int. Cl.
| | | |
|---|---|---|
| *A45B 23/00* | (2006.01) | |
| *B60J 5/04* | (2006.01) | |
| *B60R 11/00* | (2006.01) | |
| *E04H 15/28* | (2006.01) | |
| *E04H 15/06* | (2006.01) | |
| *A45B 25/18* | (2006.01) | |
| *A45B 11/00* | (2006.01) | |

(52) U.S. Cl.
CPC ............ *B60J 5/0494* (2013.01); *A45B 11/00* (2013.01); *A45B 23/00* (2013.01); *A45B 25/18* (2013.01); *B60R 11/00* (2013.01); *E04H 15/06* (2013.01); *E04H 15/28* (2013.01); *A45B 2023/0006* (2013.01); *A45B 2023/0025* (2013.01); *B60R 2011/004* (2013.01)

(58) Field of Classification Search
CPC ........... A45B 23/00; A45B 11/00; A45B 3/00; A45B 25/18; A45B 2019/002; A45B 2023/0025; A45B 2023/0006; B60R 7/12; B60R 2011/0035; B60R 2011/0082; B60R 11/00; B60R 2011/0056; B60R 2011/004; B60J 5/0494; B60J 5/04; E04H 15/06; E04H 15/28

USPC .... 135/88.05, 88.13, 88.15, 16, 34.2, 88.07, 135/20.1, 98; 296/97.4–97.6, 97.8, 97.12, 296/136.11–136.13, 152, 163; 224/549, 224/553, 560, 567, 559, 915, 482; 248/214–215, 208, 670, 205.5, 206.3, 248/528, 534, 537
See application file for complete search history.

(56) References Cited

U.S. PATENT DOCUMENTS

| | | | | |
|---|---|---|---|---|
| 4,375,268 A | * | 3/1983 | Speck | B60R 7/12 211/62 |
| 4,562,849 A | | 1/1986 | Sirota | |
| 4,795,067 A | * | 1/1989 | Hamilton | B60R 7/12 224/543 |
| 4,944,434 A | * | 7/1990 | Hamilton | B60R 9/02 224/482 |
| 5,287,871 A | | 2/1994 | Trice | |

(Continued)

FOREIGN PATENT DOCUMENTS

WO       WO9103384       3/1991

*Primary Examiner* — Winnie Yip

(57) ABSTRACT

A vehicle attached shielding assembly for protecting a user from the elements includes a base that is configured to couple to a vehicle proximate to a door of the vehicle. An umbrella is coupled to the base. The umbrella is selectively configurable in a stowed configuration, wherein the umbrella is positioned such that the vehicle is drivable. The umbrella also is selectively configurable in an extended configuration, wherein the umbrella is configured to shield a user who is positioned under the umbrella from elements, such as sunshine and rain. In the extended configuration, the umbrella also is configured to prevent the elements from entering the vehicle when the door and a window that is coupled to the door are opened.

9 Claims, 6 Drawing Sheets

(56) References Cited

U.S. PATENT DOCUMENTS

| | | | |
|---|---|---|---|
| D350,527 S | 9/1994 | Parlor, Sr. | |
| 5,385,161 A * | 1/1995 | Loker | A45B 11/00 |
| | | | 135/15.1 |
| 5,390,837 A * | 2/1995 | Ruffolo, Jr. | B60R 9/06 |
| | | | 224/482 |
| 5,529,368 A | 6/1996 | Cui et al. | |
| 5,609,321 A * | 3/1997 | McClellan | A45B 11/00 |
| | | | 248/215 |
| 5,762,308 A * | 6/1998 | Bryan | A45B 11/00 |
| | | | 135/16 |
| 6,213,137 B1 | 4/2001 | Wang | |
| 6,959,715 B2 * | 11/2005 | Siegel | A45B 11/00 |
| | | | 135/16 |
| 7,967,274 B1 * | 6/2011 | Stallings, Jr. | A45B 11/00 |
| | | | 248/206.3 |
| 8,479,962 B2 | 7/2013 | Hall | |
| 9,087,462 B1 * | 7/2015 | Gallus | G09F 17/00 |
| 9,321,336 B2 | 4/2016 | Sasaki | |
| 9,827,917 B1 * | 11/2017 | Jones | B60R 11/00 |
| 2013/0256355 A1 * | 10/2013 | Gatto-Weising | B60R 11/00 |
| | | | 224/482 |
| 2015/0305453 A1 * | 10/2015 | Gatto-Weising | A45B 11/00 |
| | | | 248/516 |

\* cited by examiner

VEHICLE ATTACHED SHIELDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to shielding assemblies and more particularly pertains to a new shielding assembly for protecting a user from the elements.

BRIEF SUMMARY OF THE INVENTION

An embodiment of the disclosure meets the needs presented above by generally comprising a base that is configured to couple to a vehicle proximate to a door of the vehicle. An umbrella is coupled to the base. The umbrella is selectively configurable in a stowed configuration, wherein the umbrella is positioned such that the vehicle is drivable. The umbrella also is selectively configurable in an extended configuration, wherein the umbrella is configured to shield a user who is positioned under the umbrella from elements, such as sunshine and rain. In the extended configuration, the umbrella also is configured to prevent the elements from entering the vehicle when the door and a window that is coupled to the door are opened.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
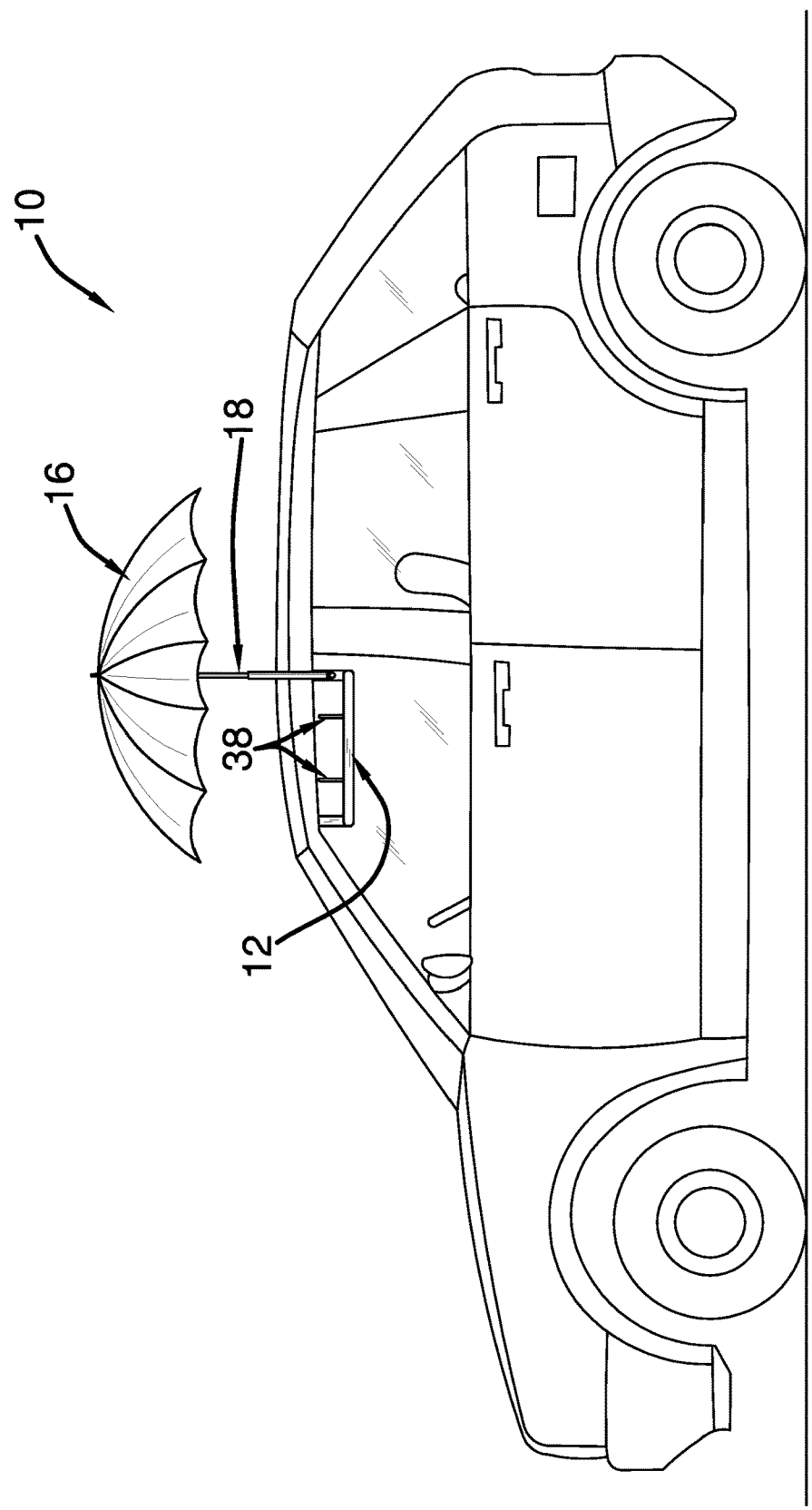
FIG. 1 is an in-use view of a vehicle attached shielding assembly according to an embodiment of the disclosure.
Figure 2:
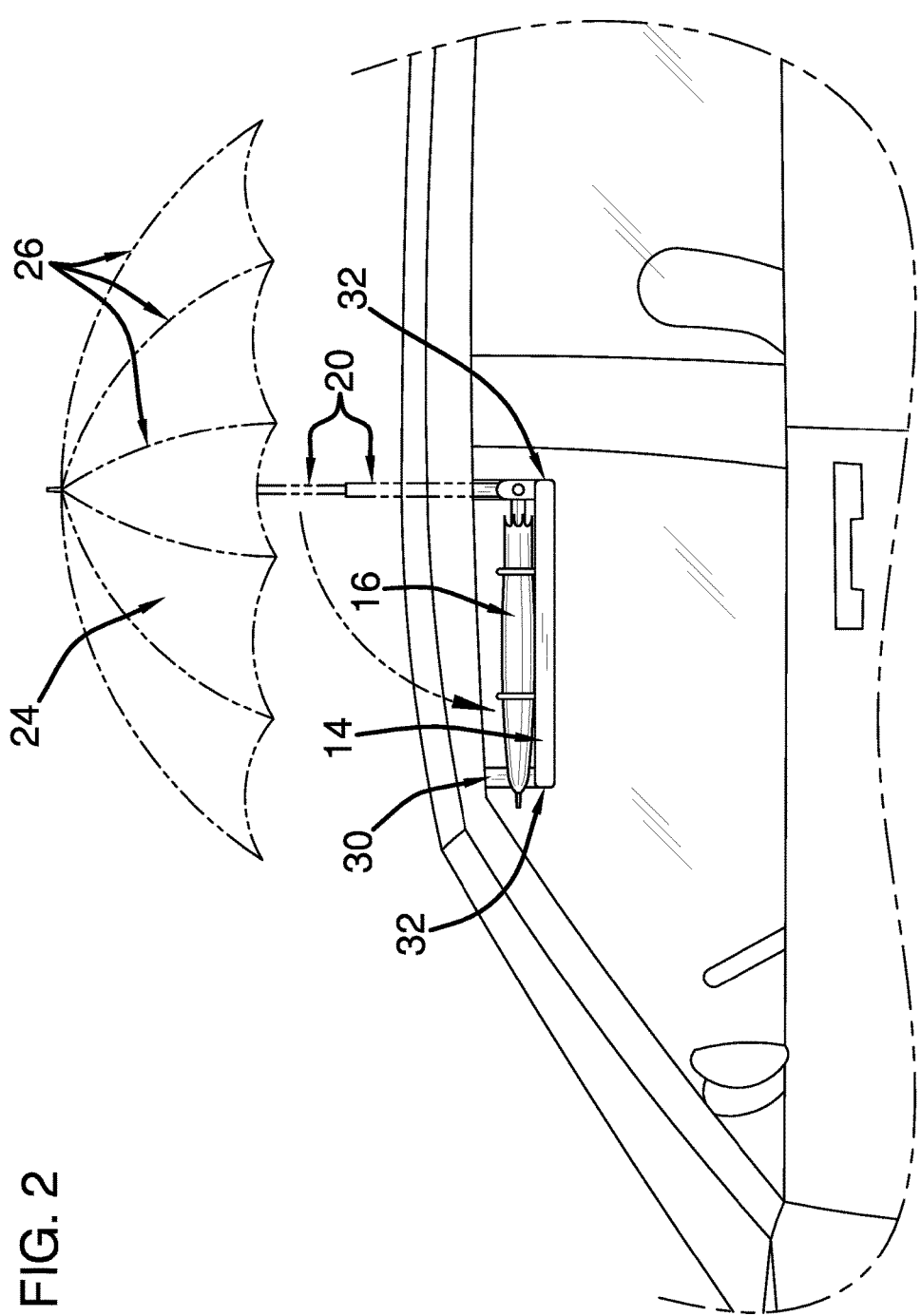
FIG. 2 is a side view of an embodiment of the disclosure.
Figure 3:
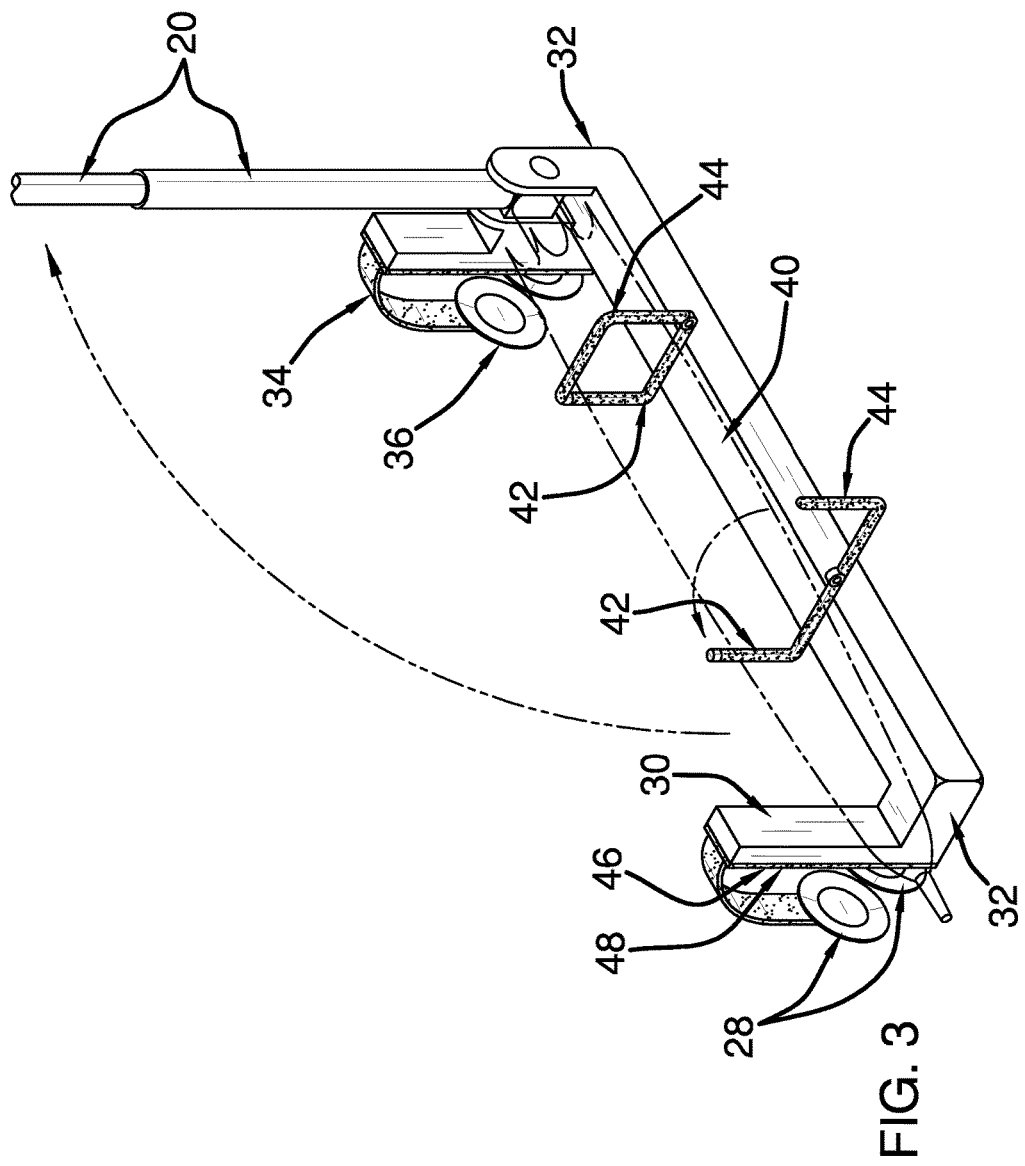
FIG. 3 is an isometric perspective view of an embodiment of the disclosure.
Figure 4:
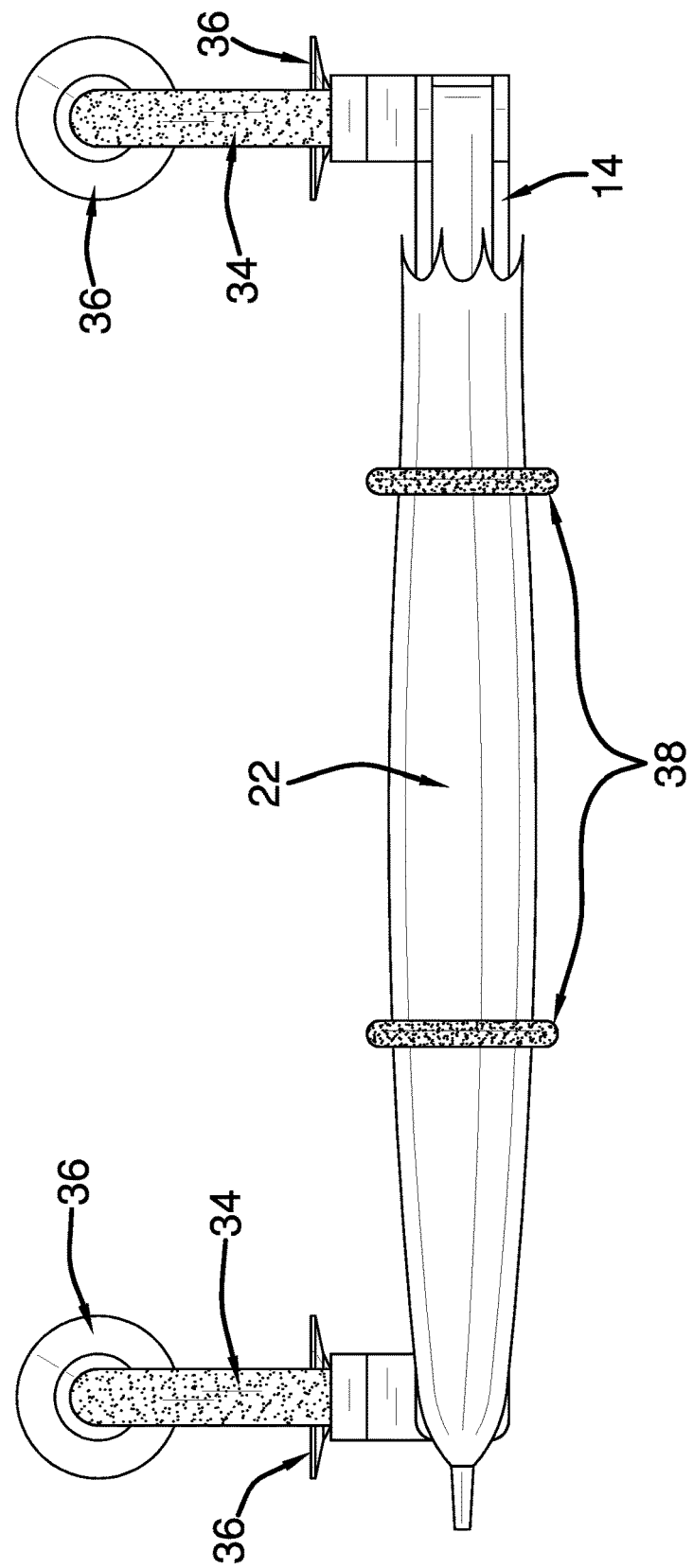
FIG. 4 is a top view of an embodiment of the disclosure.
Figure 5:
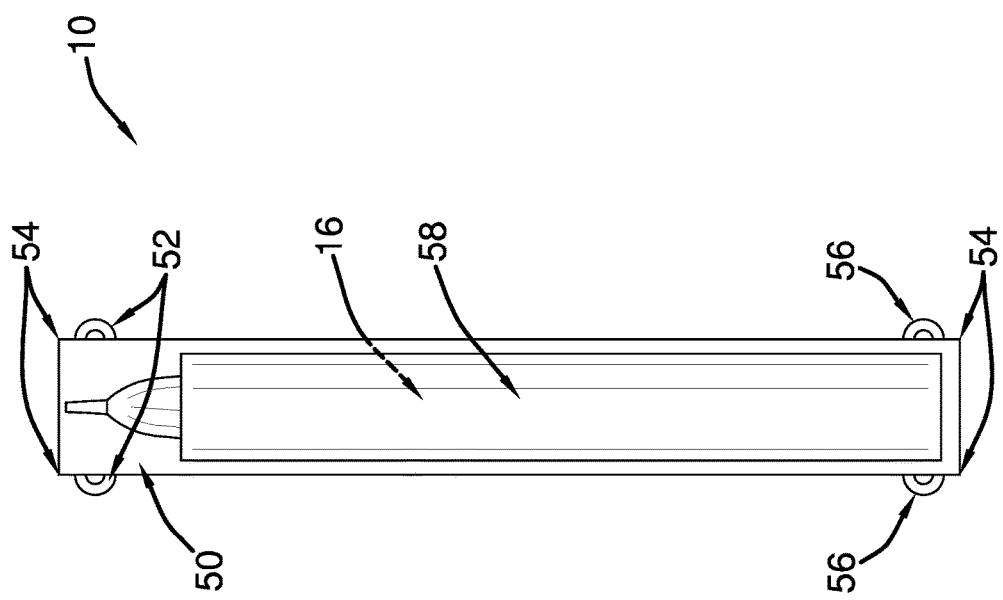
FIG. 5 is a side view of an embodiment of the disclosure.
Figure 6:
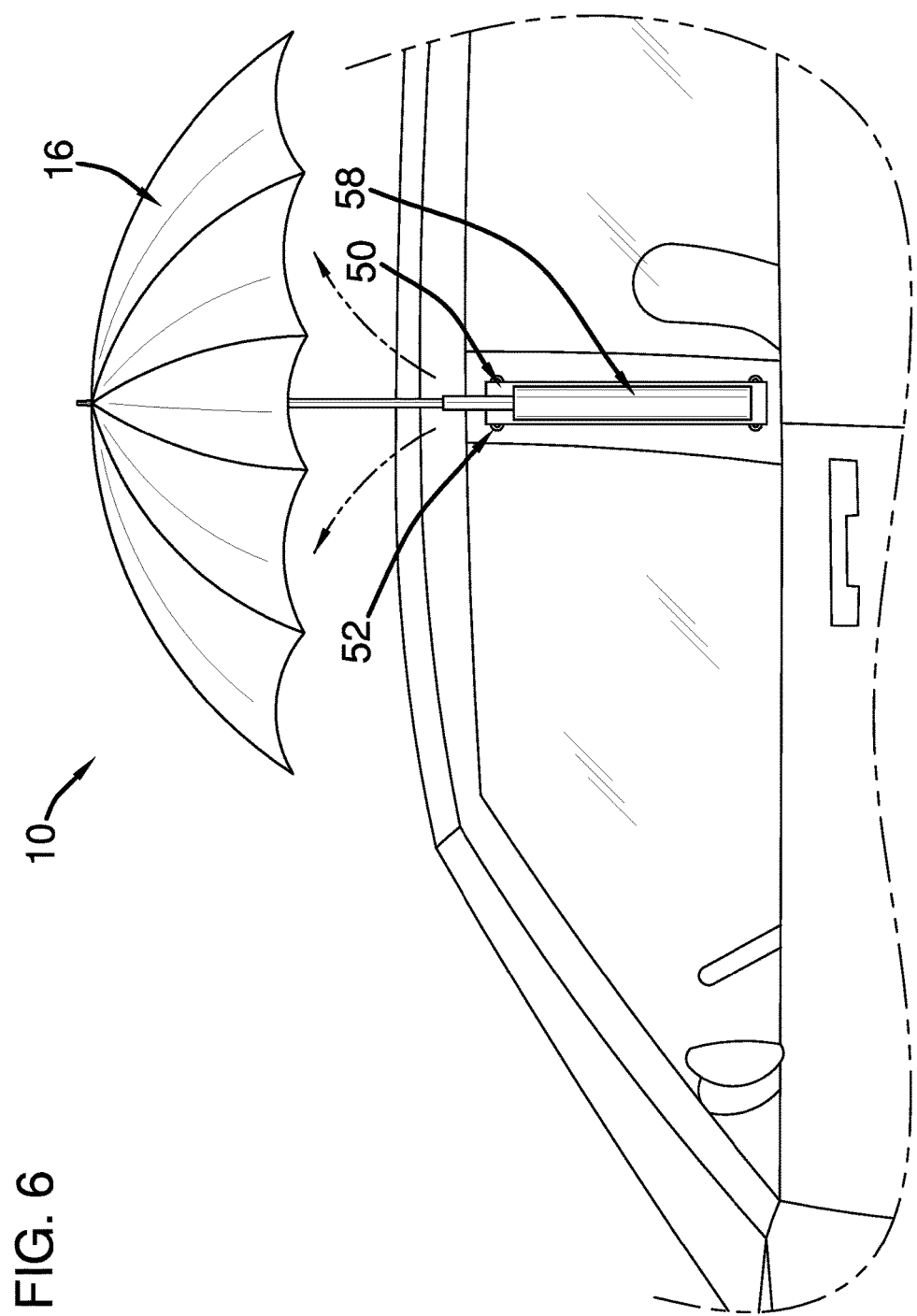
FIG. 6 is an in-use view of an embodiment of the disclosure.

With reference now to the drawings, and in particular to FIGS. 1 through 6 thereof, a new shielding assembly embodying the principles and concepts of an embodiment of the disclosure and generally designated by the reference numeral 10 will be described.

As best illustrated in FIGS. 1 through 6, the vehicle attached shielding assembly 10 generally comprises a base 12 that is configured to couple to a vehicle proximate to a door of the vehicle. In one embodiment, the base 12 comprises a first bar 14. An umbrella 16 is coupled to the base 12. The umbrella 16 is selectively configurable in a stowed configuration, wherein the umbrella 16 is positioned such that the vehicle is drivable. The umbrella 16 also is selectively configurable an extended configuration, wherein the umbrella 16 is configured to shield a user who is positioned under the umbrella 16 from elements, such as sunshine and rain. In the extended configuration, the umbrella 16 also is configured to prevent the elements from entering the vehicle when the door and a window that is coupled to the door are opened.

In one embodiment, the umbrella 16 comprises a first rod 18 that is pivotally coupled to the first bar 14. The first rod 18 comprises a plurality of nested sections 20. The first rod 18 is selectively extensible. The first rod 18 is selectively positionable substantially parallel to and substantially perpendicular to the first bar 14. A canopy 22 is coupled to the first rod 18 distal from the first bar 14. The canopy 22 is selectively positionable in a collapsed configuration for stowing and a deployed configuration to shield the user.

In another embodiment, the canopy 22 comprises a panel 24 and a plurality of second rods 26. The panel 24 is flexible and water resistant. Each second rod 26 is hingedly coupled to and extends from the first rod 18 distal from the first bar 14. Each second rod 26 is coupled longitudinally to the panel 24. In yet another embodiment, the second rods 26 are arcuate.

A plurality couplers 28 is coupled to the first bar 14. The couplers 28 are configured to couple the first bar 14 to a window of the vehicle to position the first bar 14 proximate to and substantially parallel to a top of the window.

Each of a pair of second bars 30 is coupled to and extends perpendicularly from the first bar 14. Each second bar 30 is positioned proximate to a respective opposing end 32 of the first bar 14. Each of a pair of straps 34 is coupled to and extends from a respective second bar 30 distal from the first bar 14. In this embodiment, each coupler 28 comprises a first cup 36. The first cup 36 is resilient. The first cup 36 is depressible against the window to configure the first cup 36 to suctionally couple to the window. The plurality of couplers 28 comprises four first cups 36 that are positioned singly on each strap 34, distal from the second bar 30, and singly proximate to each opposing end 32 of the first bar 14. The straps 34 are configured to position respective first cups 36 to couple to an interior of the window. Associated first cups 36 are positioned to couple to an exterior of the window to couple the first bar 14 to the window.

Each of a pair of retainers 38 is coupled to the first bar 14. Each retainer 38 is positioned substantially equally distant from a midpoint 40 of the first bar 14 and a respective opposing end 32 of the first bar 14. The retainers 38 are configured to reversibly couple to the umbrella 16 when the umbrella 16 is in the stowed configuration to retain the umbrella 16 in the stowed configuration.

In one embodiment, each retainer 38 comprises a first bracket 42 and a second bracket 44. The first bracket 42 and the second bracket 44 are L-shaped and rubber coated. The first bracket 42 is coupled to the first bar 14. The second bracket 44 is hingedly coupled to the first bracket 42. The second bracket 44 is selectively positionable in an open configuration, wherein the umbrella 16 is insertable between the first bracket 42 and the second bracket 44. The second bracket 44 also is selectively positionable in a closed configuration, wherein the first bracket 42 and the second bracket 44 are squarely shaped around the umbrella 16 to couple the umbrella 16 to the first bar 14. In another embodiment, at least one of the first bracket 42 and the second bracket 44 is magnetic. The first bracket 42 is reversibly coupled to the second bracket 44 in the closed configuration.

Each of a pair of pads 46 is coupled to a face 48 of a respective second bar 30. The pads 46 are configured to abut the window as the first bar 14 is coupled to the window. In one embodiment, the pads 46 comprises rubber.

In an alternative embodiment of the invention, the base 12 comprises a plate 50 that is substantially rectangularly shaped. The plate 50 is configured to couple proximate to a door opening of the vehicle. The plate 50 is substantially vertically positioned. A plurality of fasteners 52 is coupled to the plate 50. The fasteners 52 are configured to couple the plate 50 to the vehicle so that the plate 50 is positioned proximate to the door opening. In one embodiment, the plurality of fasteners 52 comprises four fasteners 52 that are positioned singly proximate to each corner 54 of the plate 50. In another embodiment, each fastener 52 comprises a second cup 56. The second cup 56 is resilient. The second cup 56 is depressible against a surface of the vehicle to configure the second cup 56 to suctionally couple to the vehicle. The second cups 56 are configured to couple the plate 50 to the vehicle.

A tube 58 is coupled longitudinally to the plate 50. The tube 58 is open-topped and closed-bottomed. The tube 58 is substantially complementary to the umbrella 16 when the umbrella 16 is in the stowed configuration. The umbrella 16, in the stowed configuration, is selectively positionable within the tube 58. The umbrella 16 is selectively positionable in the extended configuration. The umbrella 16 is configured to shield the user who is positioned under the umbrella 16 from the elements, such as sunshine and rain. The umbrella 16 also is configured to prevent the elements from entering the vehicle when the door and the window that is coupled to the door are opened.

In use, the straps 34 are configured to position respective first cups 36 to couple to the interior of the window. Associated first cups 36 are positioned to couple to the exterior of the window to couple the first bar 14 to the window. The retainers 38 are positioned to selectively couple to the umbrella 16 to retain the umbrella 16 in the stowed configuration. The umbrella 16 is selectively positionable in the stowed configuration such that the vehicle is drivable. The umbrella 16 also is selectively positionable in the extended configuration, wherein the umbrella 16 is configured to shield the user who is positioned under the umbrella 16 from the elements, such as sunshine and rain. In the extended configuration, the umbrella 16 also is configured to prevent the elements from entering the vehicle when the door and the window that is coupled to the door are opened.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle attached shielding assembly comprising:
a base configured for coupling to a vehicle proximate to a door of the vehicle, said base comprising a first bar;
an umbrella coupled to said base, said umbrella being selectively configurable in a stowed configuration, wherein said umbrella is configured for a user to drive the vehicle, and an extended configuration, wherein said umbrella is configured for shielding the user positioned under said umbrella from environmental elements, such as sunshine and rain, and wherein said umbrella is configured for preventing the environmental elements from entering the vehicle when the door and a window coupled to the door are opened;
said umbrella comprising:
a first rod pivotally coupled to said first bar, said first rod comprising a plurality of nested sections such that said first rod is selectively extensible, wherein said first rod is positioned on said first bar such that said first rod is selectively positionable substantially parallel to and substantially perpendicular to said first bar, and
a canopy coupled to said first rod distal from said first bar, wherein said canopy is positioned on said first rod such that said canopy is selectively positionable in a collapsed configuration, wherein said canopy is configured for stowing, and a deployed configuration, wherein said canopy is configured for shielding the user;

a plurality couplers coupled to said first bar, said couplers being configured for coupling said first bar to a window of the vehicle such that said first bar is positioned proximate to and substantially parallel to a top of the window, wherein said couplers are positioned on said first bar such that said couplers are configured for coupling said first bar to the window; and a pair of retainers coupled to said first bar, each said retainer being positioned substantially equally distant from a midpoint of said first bar and a respective said opposing end of said first bar, said retainers being configured for reversibly coupling to said umbrella when said umbrella is in the stowed configuration, wherein said retainers are positioned on said first bar such that said retainers are positioned for selectively coupling to said umbrella to retain said umbrella in the stowed configuration.

2. The assembly of claim 1, further including said canopy comprising a panel and a plurality of second rods, said panel being flexible, said panel being water resistant, each said second rod being hingedly coupled to and extending from said first rod distal from said first bar, each said second rod being coupled longitudinally to said panel.

3. The assembly of claim 2, further including said second rods being arcuate.

4. The assembly of claim 1, further including each said retainer comprising a first bracket and a second bracket, said first bracket and said second bracket being L-shaped, said first bracket and said second bracket being rubber coated, said first bracket being coupled to said first bar, said second bracket being hingedly coupled to said first bracket such that said second bracket is selectively positionable in an open configuration, wherein said umbrella is insertable between said first bracket and said second bracket, and a closed configuration, wherein said first bracket and said second bracket are squarely shaped around said umbrella coupling said umbrella to said first bar.

5. The assembly of claim 4, further including at least one of said first bracket and said second bracket being magnetic such that said first bracket is reversibly coupled to said second bracket in the closed configuration.

6. A vehicle attached shielding assembly comprising:
a base configured for coupling to a vehicle proximate to a door of the vehicle, said base comprising a first bar;
an umbrella coupled to said base, said umbrella being selectively configurable in a stowed configuration, wherein said umbrella is configured for a user to drive the vehicle, and an extended configuration, wherein said umbrella is configured for shielding the user positioned under said umbrella from environmental elements, such as sunshine and rain, and wherein said umbrella is configured for preventing the environmental elements from entering the vehicle when the door and a window coupled to the door are opened;
said umbrella comprising:
a first rod pivotally coupled to said first bar, said first rod comprising a plurality of nested sections such that said first rod is selectively extensible, wherein said first rod is positioned on said first bar such that said first rod is selectively positionable substantially parallel to and substantially perpendicular to said first bar, and
a canopy coupled to said first rod distal from said first bar, wherein said canopy is positioned on said first rod such that said canopy is selectively positionable in a collapsed configuration, wherein said canopy is configured for stowing, and a deployed configuration, wherein said canopy is configured for shielding the user;

a plurality couplers coupled to said first bar, said couplers being configured for coupling said first bar to a window of the vehicle such that said first bar is positioned proximate to and substantially parallel to a top of the window, wherein said couplers are positioned on said first bar such that said couplers are configured for coupling said first bar to the window;

a pair of second bars coupled to and extending perpendicularly from said first bar, each said second bar being positioned proximate to a respective opposing end of said first bar;

a pair of straps, each said strap being coupled to and extending from a respective said second bar distal from said first bar, each said coupler comprising a first cup, said first cup being resilient such that said first cup is depressible against the window configuring said first cup for suctionally coupling to the window, said plurality of couplers comprising a pair of said first cups positioned singly on an end of each said strap distal from said second bar and a pair of said first cups positioned singly proximate to each said opposing end of said first bar; and wherein said straps are positioned on said second bars such that said straps are configured for positioning respective said first cups on said straps for coupling to an interior of the window, such that associated said first cups on the ends of said first bar are positioned for coupling to an exterior of the window coupling said first bar to the window.

7. The assembly of claim 6, further including a pair of pads, each said pad being coupled to a face of a respective said second bar, wherein said pads are positioned on said second bars such that said pads are configured for abutting the window as said first bar is coupled to the window.

8. The assembly of claim 7, further including said pads comprising rubber.

9. A vehicle attached shielding assembly comprising:
a base configured for coupling to a vehicle proximate to a door of the vehicle, said base comprising a first bar;
an umbrella coupled to said base, said umbrella being selectively configurable in a stowed configuration, wherein said umbrella is configured for a user to drive the vehicle, and an extended configuration, wherein said umbrella is configured for shielding the user positioned under said umbrella from environmental elements, such as sunshine and rain, and wherein said umbrella is configured for preventing the environmental elements from entering the vehicle when the door and a window coupled to the door are opened, said umbrella comprising:
a first rod pivotally coupled to said first bar, said first rod comprising a plurality of nested sections such that said first rod is selectively extensible, wherein said first rod is positioned on said first bar such that said first rod is selectively positionable substantially parallel to and substantially perpendicular to said first bar, and
a canopy coupled to said first rod distal from said first bar, wherein said canopy is positioned on said first rod such that said canopy is selectively positionable in a collapsed configuration, wherein said canopy is configured for stowing, and a deployed configuration, wherein said canopy is configured for shielding the user, said canopy comprising a panel and a plurality of second rods, said panel being flexible, said panel being water resistant, each said second rod being hingedly coupled to and extending from said first rod distal from said first bar, each said second rod being coupled longitudinally to said panel, said second rods being arcuate;

a plurality couplers coupled to said first bar, said couplers being configured for coupling said first bar to a window of the vehicle such that said first bar is positioned proximate to and substantially parallel to a top of the window, wherein said couplers are positioned on said first bar such that said couplers are configured for coupling said first bar to the window;

a pair of second bars coupled to and extending perpendicularly from said first bar, each said second bar being positioned proximate to a respective opposing end of said first bar;

a pair of straps, each said strap being coupled to and extending from a respective said second bar distal from said first bar, each said coupler comprising a first cup, said first cup being resilient such that said first cup is depressible against the window configuring said first cup for suctionally coupling to the window, said plurality of couplers comprising a pair of said first cups positioned singly on an end of each said strap distal from said second bar and a pair of said first cups positioned singly proximate to each said opposing end of said first bar, wherein said straps are positioned on said second bars such that straps are configured for positioning respective said first cups on said straps for coupling to an interior of the window, such that associated said first cups on the ends of said first bar are positioned for coupling to an exterior of the window coupling said first bar to the window;

a pair of retainers coupled to said first bar, each said retainer being positioned substantially equally distant from a midpoint of said first bar and a respective said opposing end of said first bar, said retainers being configured for reversibly coupling to said umbrella when said umbrella is in the stowed configuration, wherein said retainers are positioned on said first bar such that said retainers are positioned for selectively coupling to said umbrella to retain said umbrella in the stowed configuration, each said retainer comprising a first bracket and a second bracket, said first bracket and said second bracket being L-shaped, said first bracket and said second bracket being rubber coated, said first bracket being coupled to said first bar, said second bracket being hingedly coupled to said first bracket such that said second bracket is selectively positionable in an open configuration wherein said umbrella is insertable between said first bracket and said second bracket, and a closed configuration wherein said first bracket and said second bracket are squarely shaped around said umbrella coupling said umbrella to said first bar, at least one of said first bracket and said second bracket being magnetic such that said first bracket is reversibly coupled to said second bracket in the closed configuration;

a pair of pads, each said pad being coupled to a face of a respective said second bar, wherein said pads are positioned on said second bars such that said pads are configured for abutting the window as said first bar is coupled to the window, said pads comprising rubber; and wherein said straps are positioned on said second bars such that said straps are configured for positioning respective said first cups on said straps for coupling to the interior of the window, such that associated said first cups on the ends of said first bar are positioned for coupling to the exterior of the window coupling said first bar to the window, wherein said retainers are positioned on said first bar such that said retainers are positioned for selectively coupling to said umbrella to retain said umbrella in the stowed configuration, wherein said umbrella is positioned on said base such that said umbrella is selectively positionable in the stowed configuration, wherein said umbrella is configured for the user to drive the vehicle, and the extended configuration, wherein said umbrella is configured for shielding the user positioned under said umbrella from the elements, such as sunshine and rain, and wherein said umbrella is configured for preventing the elements from entering the vehicle when the door and the window coupled to the door are opened.

* * * * *